United States Patent
Diethorn et al.

(10) Patent No.: US 7,734,035 B2
(45) Date of Patent: Jun. 8, 2010

(54) METHOD AND APPARATUS FOR SOFT-RESPONSE ECHO SUPPRESSION

(75) Inventors: Eric John Diethorn, Long Valley, NJ (US); Richard Szajdecki, Jackson, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1319 days.

(21) Appl. No.: 11/068,199

(22) Filed: Feb. 28, 2005

(65) Prior Publication Data

US 2006/0193464 A1 Aug. 31, 2006

(51) Int. Cl.
*H04M 9/08* (2006.01)
(52) U.S. Cl. .................................. 379/406.05
(58) Field of Classification Search ............. 379/406.05
See application file for complete search history.

(56) References Cited

U.S. PATENT DOCUMENTS 6,442,275 B1 8/2002 Diethorn 6,834,108 B1 * 12/2004 Schmidt ................ 379/406.01

OTHER PUBLICATIONS

M. M. Sondhi and D. A. Berkley entitled "Silencing Echoes On The Telephone Network," Proceedings of the IEEE, vol. 68, No. 8, pp. 948-963, Aug. 1980.

* cited by examiner

*Primary Examiner*—Alexander Jamal
(74) *Attorney, Agent, or Firm*—Joseph B. Ryan; Jason Paul DeMont; Wayne S. Breyer

(57) ABSTRACT

Methods and apparatus are provided for reducing echo from a received signal. A suppression gain is applied to an output of an echo canceler that has processed the received signal. The suppression gain includes a region of sloping attenuation about a decision point. The echo canceler optionally estimates an echo path and subtracts then estimate from the received signal. The suppression gain includes a non-zero lower bound, $g_{min}$, on a maximum attenuation applied by a suppressor, that is based on operating conditions of the echo canceler. The region of sloping attenuation applies a variable amount of attenuation that depends on the size of an output error $\bar{e}(n)$ of the echo canceler relative to the received signal, $x(n)$.

18 Claims, 2 Drawing Sheets

METHOD AND APPARATUS FOR SOFT-RESPONSE ECHO SUPPRESSION

FIELD OF THE INVENTION

The present invention relates generally to techniques for echo control in acoustic systems, and more particularly, to improved methods and systems for improved echo suppression in an echo controller.

BACKGROUND OF THE INVENTION

In many acoustic systems, such as traditional telephone systems and evolving voice-over-IP (VoIP) systems, it is desirable to minimize acoustic and electrical echoes. Typically, acoustic signals are first processed using echo cancellation techniques and then any residual echoes are processed using echo suppression techniques. For a detailed discussion of conventional echo control techniques, see, for example, M. M. Sondhi and D. A. Berkley entitled "Silencing Echoes On The Telephone Network," Proceedings of the IEEE, Vol. 68, No. 8, pages 948-963, August 1980.

For example, a media processor in a voice-over-IP network typically includes an echo controller, such as a software-based echo canceler-suppressor. The echo controller eliminates acoustic and electrical echo originating, for example, from endpoints and line trunks that communicate via time-domain multiplex (TDM) connections. The echo controller is engaged in a variety of call topologies in which there is a TDM-to-IP speech-signal conversion boundary. For example, in a call from an IP terminal to a TDM terminal within the same port network, a media processor engages an echo controller to control acoustic echo originating at the TDM terminal that would otherwise be perceived by the IP phone user. When present, this acoustic echo is caused by the loudspeaker-to-microphone coupling in the TDM phone's handset, headset or speakerphone.

While existing echo suppression techniques provide adequate performance for most applications, they suffer from a number of limitations, which if overcome, could further improve the reduction of echoes in acoustic systems. A need therefore exists for improved echo suppression techniques for use in the echo suppressor component of an echo controller. Another need exists for an echo controller that demonstrates an improved ability to respond to acoustic echo originating from, for example, TDM speakerphones not equipped with an acoustic echo canceler. A further need exists for an echo controller that improves acoustic-echo control performance in essentially all call scenarios, such as speakerphones, handsets, and headsets, and improves electrical-echo control performance in call connections involving a TDM trunk.

SUMMARY OF THE INVENTION

Generally, methods and apparatus are provided for reducing echo from a received signal. A suppression gain is applied to an output of an echo canceler that has processed the received signal. The suppression gain includes a region of sloping attenuation about a decision point. The echo canceler optionally estimates an echo path and subtracts the estimate from the received signal. The suppression gain includes a non-zero lower bound, $g_{min}$, on a maximum attenuation applied by a suppressor, that is based on operating conditions of the echo canceler.

The region of sloping attenuation applies a variable amount of attenuation that depends on the size of an output error $\bar{e}(n)$ of the echo canceler relative to the received signal, x(n). The decision point, T, is established to ensure that a residual echo is sufficiently attenuated without significant attenuation of speech from a near-side talker and is based, for example, on an estimate of the echo return loss (ERL) associated with the echo path and an echo return loss enhancement (ERLE).

A more complete understanding of the present invention, as well as further features and advantages of the present invention, will be obtained by reference to the following detailed description and drawings.

DETAILED DESCRIPTION

The present invention provides improved echo suppression techniques for use in the echo suppressor component of an echo controller.

Principles of Echo Control

Figure 1:
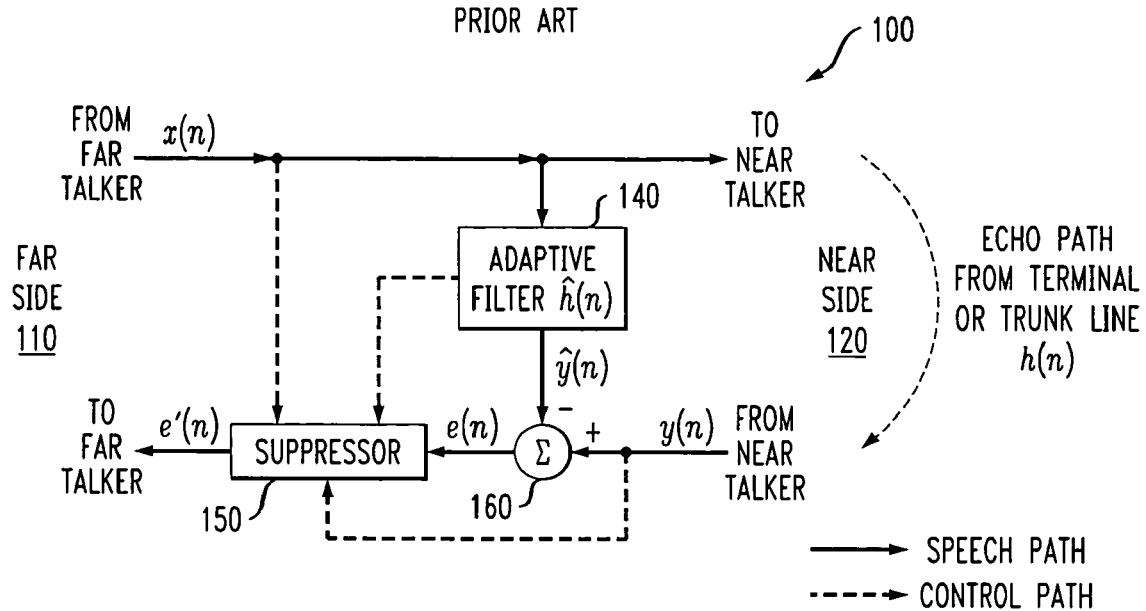
FIG. 1 is a schematic block diagram of an exemplary conventional echo controller.

FIG. 1 is a schematic block diagram of an exemplary conventional echo controller 100. As shown in FIG. 1, a telephone user is located at the far side 110 of the echo controller 100, while the echo originates from a terminal or trunk line on the near side 120 of the controller 100. The echo controller 100 eliminates or reduces echo perceived by the far-side talker. The controller 100 comprises an echo canceler 140 and an echo suppressor 150. Generally, the echo canceler 140 uses an adaptive filter to estimate the physical echo path and then subtracts the estimate from the echo signal, in a known manner. In addition, the echo suppressor 150 attenuates residual echo not canceled by the echo canceler 140. As discussed hereinafter, the present invention provides improved echo suppression techniques for use in the echo suppressor 150.

For a more detailed discussion of conventional echo cancellation techniques, see, for example, M. M. Sondhi and D. A. Berkley entitled "Silencing Echoes On The Telephone Network," Proceedings of the IEEE, Vol. 68, No. 8, pages 948-963, August 1980. Generally, as shown in FIG. 1, the adaptive filter in the echo canceler 140 manipulates the model impulse response $\hat{h}(n)$ to estimate the impulse response (Green's function) of the true physical echo path, h(n), originating at the near side. The estimate $\hat{h}(n)$ is convolved with the received speech signal, x(n), to produce an estimate $\hat{y}(n)$ of the true speech echo y(n) (assuming no near-side speech is present). This estimate is subtracted at a summation stage 160 from the actual echo to produce the echo canceler output error $e(n)=y(n)-\hat{y}(n)$. Under ideal conditions, the echo is modeled and canceled perfectly, in which case e(n) contains only speech (and possibly room noise) originating at the near-side terminal or line end.

For a variety of practical reasons, the echo canceler 140 provides less than ideal modeling and cancellation of the echo, and so an echo suppressor 150 is required to reduce the magnitude of the echo to a level that is not noticeable to the far-side talker. The suppressor 150 implements a dynamic attenuator, or gain control, in the form e'(n)=g(n)e(n), where g(n) is a time-varying gain function satisfying $0 \leq g(n) \leq 1$. Ideally, attenuation is applied only when it is certain that y(n) contains no speech from the near-side talker. Otherwise, near-side speech will be attenuated or clipped.

Echo Suppression Techniques

Most of the control paths in FIG. 1 (indicated by dotted lines) represent measurement of the envelopes, or smoothed magnitudes, of the signal paths. Let $\bar{x}(n)$ denote the envelope of x(n) in decibels, $$\bar{x}(n) = 20 \log_{10}\{\alpha\bar{x}(n-1)+(1-\alpha)|\bar{x}(n)|\} \quad (1)$$

where $0<\alpha<1$ is a smoothing constant providing a mechanism of averaging. In one implementation, α can be chosen to provide a time constant of about 15 milliseconds. Similar to Eq. (1), the envelopes $\bar{y}(n)$ and $\bar{e}(n)$ are also defined. Define an estimate of the echo return loss (ERL) associated with the echo path as:

$$ERL = \bar{x}(n) - \bar{y}(n). \quad (2)$$

Generally, ERL is a measure of the bulk level, or loudness, of the echo. If there is loss in the echo path (the echo is weak), ERL is positive; and if there is gain in the echo path (loud echo), ERL is negative. The ERL computed using Eq. (2) must be computed when only far-side speech is present; if near-side speech or near-side noise is present, the measure will be disturbed. Alternatively, and more accurately, the ERL can be computed as the sum of the squares of $\hat{h}(n)$ after the adaptive filter in the echo canceler 140 has converged sufficiently to the echo path. Finally, assuming only far-side speech is present, the echo return loss enhancement (ERLE) is defined by $$ERLE = \bar{y}(n) - \bar{e}(n). \quad (3)$$

The ERLE is a measure of the performance of the echo canceler and is more positive as the canceler converges to the true echo path. The ERL and ERLE are used by the suppressor 150 to compute decision thresholds and gain quantities.

Center Clipping Suppression Techniques

Figure 2:
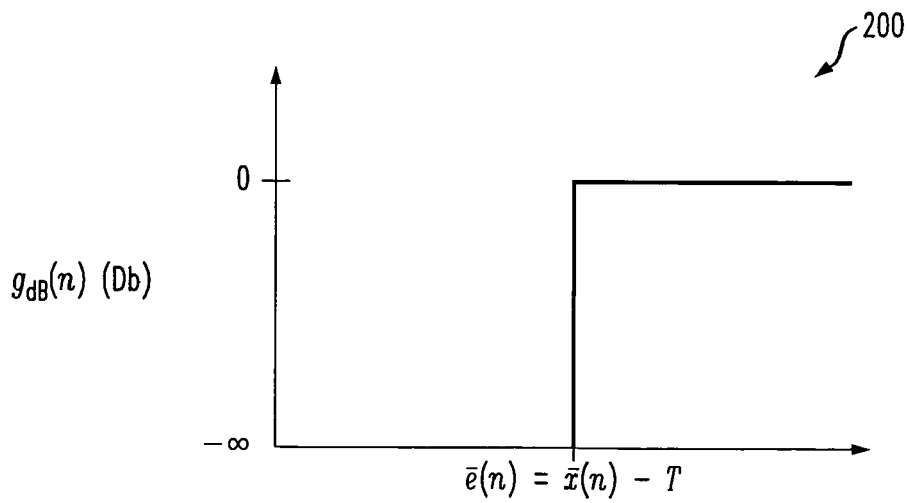
FIG. 2 illustrates the gain function of a conventional center clipper suppression technique.

An echo suppressor 150 implements a multiplicative gain function. FIG. 2 illustrates the gain function 200 of a center clipper suppression technique. Referring to FIG. 2, when $\bar{e}(n)$ is larger than $\bar{x}(n)-T$, where T is a nonnegative threshold, $\bar{e}(n)$ likely contains near-side speech. In this case, the clipper should apply a gain of unity (0 dB). When $\bar{e}(n)$ is smaller than $\bar{x}(n)-T$, $\bar{e}(n)$ likely contains mostly residual echo, in which case infinite attenuation is applied. Typically, T is chosen to take on values in the range $18 \leq T \leq 36$ dB. If T=36 dB, for example, infinite attenuation is applied to the echo canceler's output $\bar{e}(n)$ if $\bar{e}(n) < \bar{x}(n)-36$. This would be the case if the echo canceler 140 is performing very well and there is no speech from the near-side talker present. Alternatively, T can be chosen based on the estimated performance of the echo canceler 140. For example, if ERL+ERLE>>0, so that the total echo reduction is large, T can be chosen large because the residual echo level is small.

A disadvantage of the center clipper is its binary-like behavior about the threshold point. The attenuation varies from unity to infinite attenuation for residual signals $\bar{e}(n)$ that are hovering around the point $\bar{x}(n)-T$. Inevitably, this characteristic causes low-level near-talker speech to be clipped. Additionally, residual echo that is just above the threshold point is not clipped and is therefore transmitted to the far-side talker where it may be perceived.

Soft-Response Echo Suppression Algorithm

Figure 3:
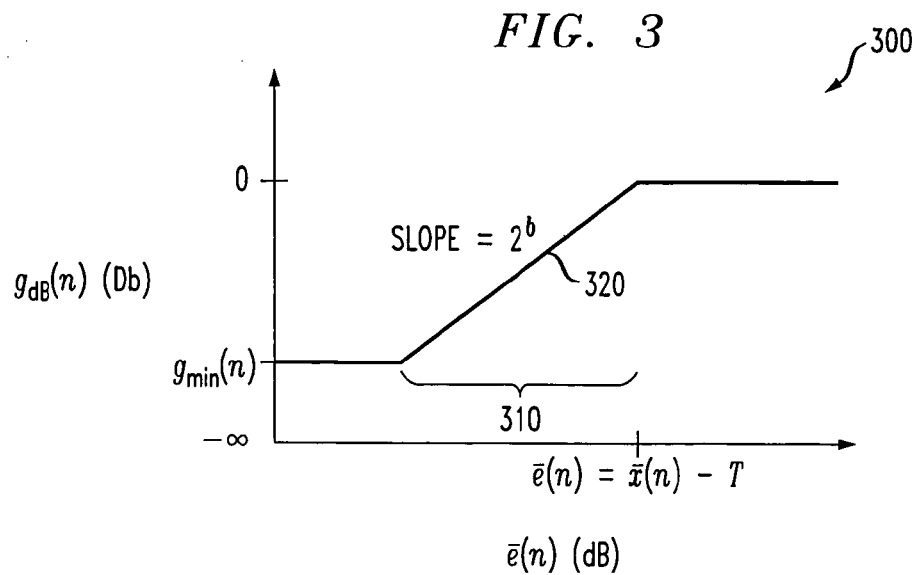
FIG. 3 illustrates a gain function of a soft-response suppression algorithm that incorporates features of the present invention.

According to one aspect of the present invention, the shortcomings of the center clipper are addressed by modifying the gain function to include a region of variable, sloping attenuation about the decision point. FIG. 3 illustrates a gain function 300 of a soft-response suppression algorithm in accordance with the present invention. A suppressor 150 that employs the gain function 300 of the disclosed soft-response suppression algorithm differs from the center clipper in a number of aspects. First, a non-zero lower bound, $g_{min}$, is enforced on the maximum attenuation applied by the gain function 300. This bound limits the attenuation to the maximum necessary to prevent perceptible echo. As discussed below, the bound is computed from the operating conditions of the echo canceler 140. In addition, a broad middle region 310 of the gain function 300 is defined. In this "soft" region 310, the suppressor 150 applies a variable amount of attenuation that depends on the size of $\bar{e}(n)$ relative to $\bar{x}(n)$. This feature eliminates the harsh "on-off" sound of the traditional center clipper. The slope of the line 320 in FIG. 3 defines the width of the soft region 310.

The value of $\bar{e}(n)$ relative to $\bar{x}(n)$ determines the point below which attenuation is applied. Generally, the threshold, T, must be small enough to ensure residual echo is attenuated sufficiently, but large enough so as to avoid attenuation of speech from the near-side talker when present. Thus, T should be chosen based on 1) the expected level of the physical echo, which is just the ERL, and 2) the performance of the echo canceler.

Figure 4:
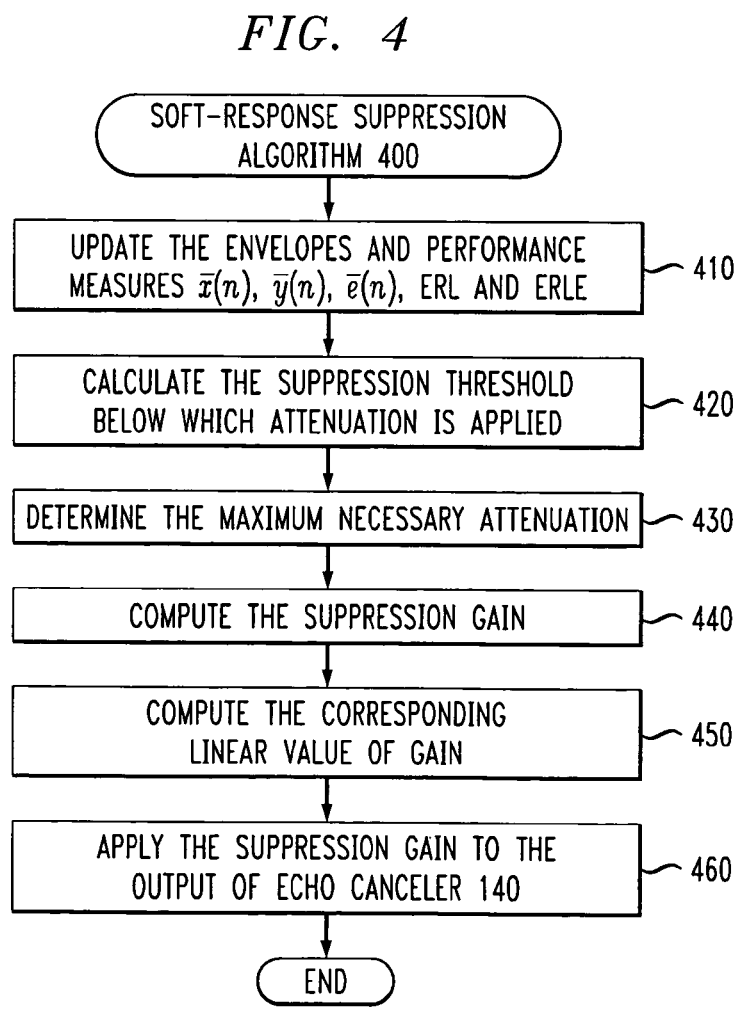
FIG. 4 is a flow chart describing an exemplary implementation of a soft-response suppression algorithm that establishes the value of various parameters of the gain function of FIG. 3.

FIG. 4 is a flow chart describing an exemplary implementation of a soft-response suppression algorithm 400 that establishes the value of the threshold, T, and other parameters. At each time sample, or time block, in the real-time processing implementation, the soft suppressor executes the following steps:

1) Update the following envelopes and performance measures during step 410, as described in equations (1)-(3): $\bar{x}(n)$, $\bar{y}(n)$, $\bar{e}(n)$, ERL and ERLE.

2) Calculate the suppression threshold below which attenuation is applied during step 420:

T=ERL+ERLE−Guard, where Guard>0 in decibels, e.g., Guard=10 dB.

It is noted that the threshold guard, Guard, can be chosen to provide a more conservative, or liberal, threshold point. Because ERL and ERLE are estimated quantities, the threshold guard provides a means of compensating for the variances of these estimates. In one exemplary implementation, Guard is made positive to achieve more conservative control of residual echo. With Guard positive, T is smaller for a given ERL and ERLE, and therefore $\bar{x}(n)-T$ in FIG. 3 is moved to the right.

3) Determine the maximum necessary attenuation during step 430. Compute the required attenuation to meet a total echo reduction of 55 dB (or another amount):

$g_{min,dB}(n) = -55$ dB+ERL+ERLE.

It is noted that the lower bound is computed assuming a 55 dB level of total echo control (which has been found to be sufficient in most applications).

4) Compute the suppression gain during step 440:

$$g_{db}(n) = \max[g_{min,dB}, \min[0, \overline{e}(n) - \overline{x}(n) + T]].$$

(To simplify the immediate discussion, it is assumed that the slope of the soft region in FIG. 3 is unity (b=0). Later, the case of nonzero b is discussed.)

5) Compute the corresponding linear value of gain during step 450: $g(n) = 10^{g_{dB}(n)/20}$, where "20" assumes decibels are computed using 20 log 10(x) for some quantity x.

6) Apply the suppression gain to the output of echo canceler 140 during step 460: $e'(n) = g(n)e(n)$.

Example

Suppose that for some processing time index n, ERL=15 dB, ERLE=12 dB, and let Guard=10 dB. Then, steps 420 through 440 of the soft-response suppression algorithm 400 yield:

Step 420. T=ERL+ERLE−Guard=15+12−10=17 dB.

Step 430. $g_{min}(n)$=−55 dB+ERL+ERLE=−55+15+12=−28 dB.

Step 440. $g_{dB}(n)$=max[−28, min[0, $\overline{e}(n)$−$\overline{x}(n)$+17]].

So, attenuation is applied if $\overline{e}(n)$ is 17 dB or more below $\overline{x}(n)$, and a maximum of 28 dB of attenuation is applied.

Extensions

The threshold T should be bounded to reflect the maximum performance expected in any real situation. For example, if the sum ERL+ERLE is never expected to exceed 40 dB or be less than 0 dB, the threshold should be computed as T=max[0, min(40, ERL+ERLE)]−Guard.

In step 440 of the soft-response suppression algorithm 400, 1 dB of attenuation is added for every 1 dB that $\overline{e}(n)$ is below the quantity $\overline{x}(n)$−T. This is a linear rate of suppression. The rate can be increased to be more dramatic if linear suppression is not adequate. Thus, step 440 can be modified to $$g_{dB}(n) = \max\{g_{min,dB}, \min[0, (\overline{e}(n) - \overline{x}(n) + T) << b]\} \quad (4)$$

where b>0, integer, specifies the slope of the line in FIG. 3. In one exemplary implementation, b=2. Thus, an additional 2 dB of attenuation is applied for every 1 dB that $\overline{e}(n)$ is below $\overline{x}(n)$−T.

It is to be understood that the embodiments and variations shown and described herein are merely illustrative of the principles of this invention and that various modifications may be implemented by those skilled in the art without departing from the scope and spirit of the invention.

We claim:

1. A method comprising:
   receiving a signal processed by an echo canceler and computing a suppression gain, $g_{dB}(n)$, based on (max[$g_{min,dB}$, min[0, $\overline{e}(n)$−$\overline{x}(n)$+T]]), where:
   i. T is a threshold that is computed based on (ERL+ERLE−Guard), where:
      (a) ERL is an echo return loss,
      (b) ERLE is an echo return loss enhancement, and
      (c) GUARD is a value that compensates for variances in one or both of the ERL and ERLE, wherein GUARD>=0 decibels,
   ii. $g_{min,dB}$ is a value that is computed to satisfy an echo reduction of Y decibels, wherein $g_{min,dB}$ is computed based on (−Y dB+ERL+ERLE),
   iii. $\overline{e}(n)$ is an output error of the signal processed by the echo canceler, and
   iv. $\overline{x}(n)$ is a measurement of one or more control paths; and
   applying the suppression gain, $g_{dB}(n)$, to the signal processed by the echo canceler.

2. The method of claim 1 further comprising computing a linear value, g(n), for the suppression gain, $g_{dB}(n)$, wherein the linear value, g(n), is based on, ($10^{g_{db}(n)/M}$), and wherein M is based on decibels that are computed using Mlog 10(x).

3. The method of claim 2 further comprising modifying the suppression gain, $g_{dB}(n)$, when the linear value, g(n), fails to satisfy a suppression criteria, wherein the suppression gain, $g_{dB}(n)$, is modified to, (max[$g_{min,dB}$, min[0, ($\overline{e}(n)$−$\overline{x}(n)$+T)<<b]]), wherein b>0.

4. The method of claim 2 wherein applying the suppression gain, $g_{dB}(n)$, to the signal processed by the echo canceler is based on, (g(n)e(n)).

5. The method of claim 1 wherein the value, $g_{min,dB}$, establishes a maximum attenuation applied by the suppression gain, $g_{dB}(n)$.

6. The method of claim 1 wherein $g_{min,dB}$ establishes a non-zero limit on the suppression gain, $g_{dB}(n)$.

7. The method of claim 6 wherein the non-zero limit is based, at least in part, on operating conditions of the echo canceler.

8. The method of claim 1 wherein the suppression gain, $g_{dB}(n)$, applies a variable amount of attenuation based, at least in part, on the size of the echo canceler's output error $\overline{e}(n)$ relative to $\overline{x}(n)$.

9. The method of claim 1 wherein the suppression gain, $g_{dB}(n)$, includes a region of sloping attenuation about the threshold, T.

10. An apparatus comprising:
    an echo canceler; and
    a suppressor, wherein the suppressor computes a suppression gain, $g_{dB}(n)$, based on, (max[$g_{min,dB}$, min[0, $\overline{e}(n)$−$\overline{x}(n)$+T]]), where:
    i. T is a threshold that is computed based on (ERL+ERLE−Guard), where:
       (a) ERL is an echo return loss,
       (b) ERLE is an echo return loss enhancement, and
       (c) GUARD is a value that compensates for variances in one or both of the ERL and ERLE, wherein GUARD>=0 decibels,
    ii. $g_{min,dB}$ is a value that is computed to satisfy an echo reduction of Y decibels, wherein $g_{min,dB}$ is computed based on (−Y dB+ERL+ERLE),
    iii. $\overline{e}(n)$ is an output error of the signal processed by the echo canceler, and
    iv. $\overline{x}(n)$ is a measurement of one or more control paths;
    wherein the suppressor applies the suppression gain, $g_{dB}(n)$, to the signal processed by the echo canceler.

11. The apparatus of claim 10 wherein the suppressor computes a linear value, g(n), for the suppression gain, $g_{dB}(n)$, wherein the linear value, g(n), is based on, ($10^{g_{db}(n)/M}$), and wherein M is based on decibels that are computed using M log 10(x).

12. The apparatus of claim 11 wherein the suppressor modifies the suppression gain, $g_{dB}(n)$, when the linear value, g(n), fails to satisfy a suppression criteria, wherein the suppression gain, $g_{dB}(n)$, is modified to, (max[$g_{min,dB}$, min[0, ($\overline{e}(n)$−$\overline{x}(n)$+T)<<b]]), wherein b>0.

13. The apparatus of claim 11 wherein the suppressor applies the suppression gain, $g_{dB}(n)$, to the signal processed by the echo canceler is based on, $(g(n)e(n))$.

14. The apparatus of claim 10 wherein the suppressor establishes the value, $g_{min,dB}$, to enforce a maximum attenuation applied by the suppression gain, $g_{dB}(n)$.

15. The apparatus of claim 10 wherein $g_{min,dB}$ establishes a non-zero limit on the suppression gain, $g_{dB}(n)$.

16. The apparatus of claim 15 wherein the non-zero limit is based, at least in part, on operating conditions of the echo canceler.

17. The apparatus of claim 1 wherein the suppressor applies a variable amount of attenuation based, at least in part, on the size of the echo canceler's output error $\overline{e}(n)$ relative to $\overline{x}(n)$.

18. The apparatus of claim 10 wherein the suppression gain, $g_{dB}(n)$, includes a region of sloping attenuation about the threshold, T.

* * * * *